United States Patent [19]

Furlong

[11] Patent Number: 4,462,166
[45] Date of Patent: Jul. 31, 1984

[54] DEVICE FOR MEASURING LENGTHS AND CONFORMING ANGLES

[76] Inventor: Stanley J. Furlong, 450 SE. Lacreole Dr., Dallas, Oreg. 97338

[21] Appl. No.: 394,126

[22] Filed: Jul. 1, 1982

[51] Int. Cl.³ .............................. G01B 3/08; G01B 5/02
[52] U.S. Cl. ........................................ 33/416; 33/161; 33/484
[58] Field of Search ................ 33/161, 417, 416, 423, 33/496, 483, 484, 489, 296, 293, 203.2, 203.21

[56] References Cited

U.S. PATENT DOCUMENTS

| 164,133 | 6/1875 | Blatchly | 33/161 X |
| 838,371 | 12/1906 | Bender | 33/161 X |
| 2,245,646 | 6/1941 | Bullivant | 33/161 X |
| 2,744,332 | 5/1956 | Day | 33/416 |
| 2,875,523 | 3/1959 | Fay | 33/416 |
| 3,373,496 | 3/1968 | Nelson | 33/423 |
| 3,995,373 | 12/1976 | Brumbelow | 33/161 |
| 4,180,914 | 1/1980 | Lechner | 33/161 |

Primary Examiner—William D. Martin, Jr.
Attorney, Agent, or Firm—Charles N. Hilke

[57] ABSTRACT

A telescoping measuring rafter gauge comprising two telescoping members with locking devices. Further comprising two sliding pitch locating plates with tightening devices, where said pitch locating plates fit flush against a center ridge pole or hip rafter with graduations marked along the telescoping inner member of the rafter gauge. Hinge means are provided on the telescoping outer member.

5 Claims, 8 Drawing Figures

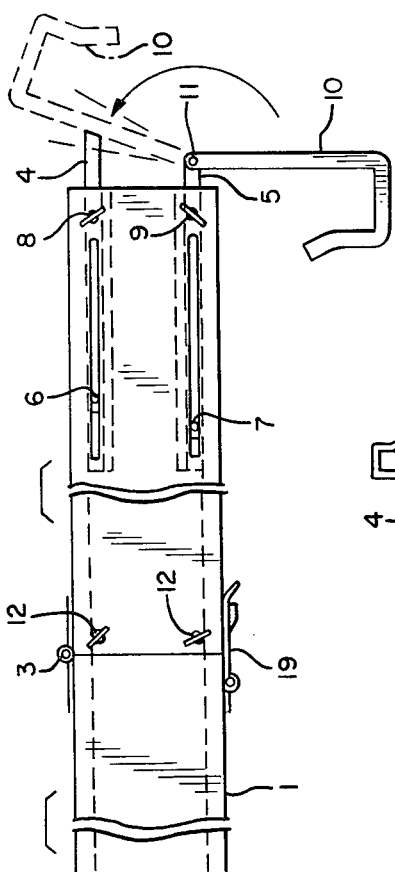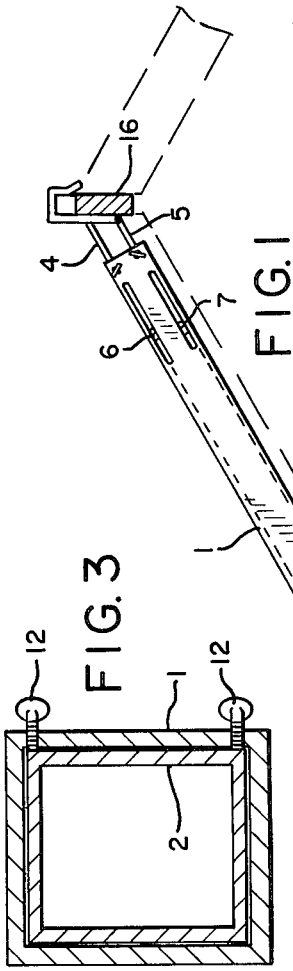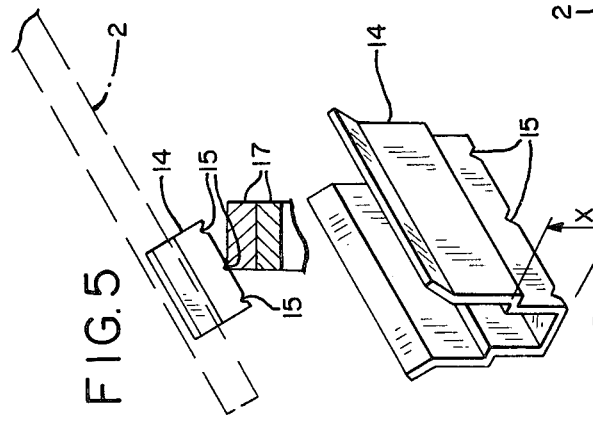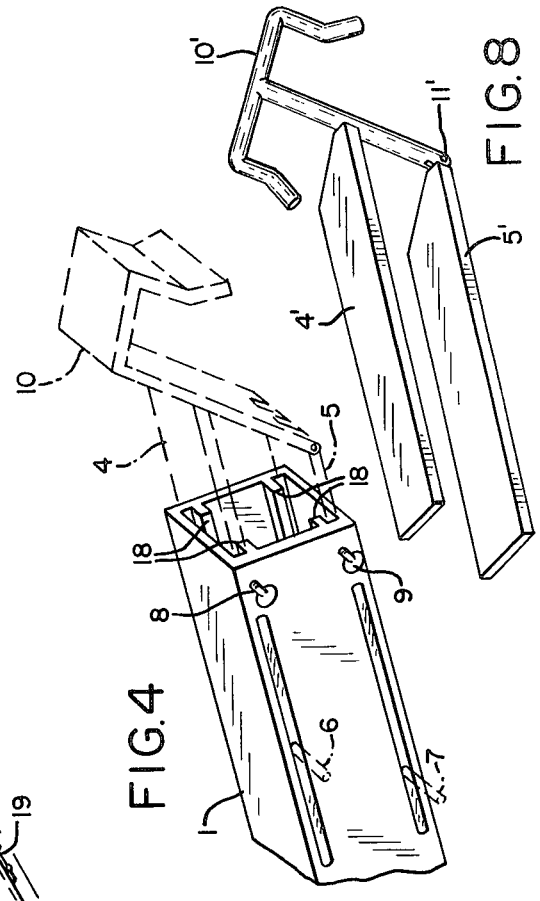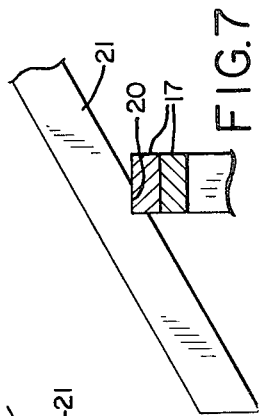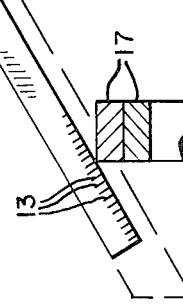

DEVICE FOR MEASURING LENGTHS AND CONFORMING ANGLES

BACKGROUND OF THE INVENTION

This invention pertains to a measuring rafter gauge which will locate the pitch of any roof and which will locate the length of the common, hip and valley rafter along with the position and angle of the seat cut and is self-squaring.

Previous inventions in this area have not been able to perform all six functions with a single device. U.S. Pat. No. 1,683,438, roof framing rule, provides various rules for the location and positioning of various rafters, but it does not measure the length in a single operation, requiring the repositioning of the rule several times along the length of the rafter to be cut and, in addition, requires the use of a book of tables to convert the measurement into the proper angle.

There are other tools which are used from the ground to provide the pitch but are not able to provide the length of the rafter or the position of the seat cut. The squangle, U.S. Pat. No. 3,289,301, allows the pitch to be obtained from the ground. Of course, even a sextant could perform this operation. But neither instrument will provide the length of the rafters or the position of the seat cut.

While there have been various rafter books and tables produced, these books have not been recently published. Generally, today's carpenters are not well versed in the use of rafter books and tables. Consequently, common, hip and valley rafters leave much to be desired.

SUMMARY OF THE INVENTION

Accordingly, the present invention provides a method whereby the length of the rafter, the angle of the rafter, self-squaring of the rafter, and the positioning and angle of the seat cut are measured with a single tool. An inner member, marked with graduations, extends to the appropriate length. The graduations mark the positioning of the seat cut.

The pitch locating plates when extended allow the tool to be held at different angles.

The telescoping means allow the rafters to be cut at different lengths.

The width of the pitch locating plates provide self-squaring of the rafter gauge for accurate measurement of the length of the rafters.

A holding clip at the end of the tool located at the ridge pole or hip rafter provides appropriate height which is equal to the depth of the seat cut for accurate measurement.

A width clip is provided on the bottom lower side next to the plate of such thickness to equal the width measurement of the rafters greater than 3½ inches.

A hinge is provided on the outer member so that the tool may be used from 5½ foot rafters to 20 foot rafters.

Special valley pitch locating plates are provided for valley rafters.

BRIEF DESCRIPTION OF THE DRAWINGS

FIG. 1 is a side view of the telescoping measuring rafter gauge in use.

FIG. 2 is a side view of the telescoping measuring rafter gauge.

FIG. 3 is a cutaway view of the telescoping measuring rafter gauge along lines 3—3 of FIG. 1.

FIG. 4 is a perspective detail view of the sliding pitch locating plates and holding clip.

FIG. 5 is a side view showing the use of a rafter width clip in operation.

FIG. 6 is a perspective view of the rafter width clip.

FIG. 7 is a side view of the rafter showing the seat cut.

FIG. 8 is a perspective view of the hip and valley pitch locating plates and holding clip.

DESCRIPTION OF THE PREFERRED EMBODIMENTS

In FIG. 2, the inner member 2 contains graduations 13 which telescope within the outer member 1. The outer member 1 contains a hinge 3 and clasp 19 at the midpoint of the outer member 1. The upper pitch locating plate 4 is moveable through the screwably attached upper operating pin 6. The positioning of the upper sliding pitch locating plate 4 is fixed by the upper tightening device 8. The lower sliding pitch locating plate 5 is moveable through the screwably attached lower operating pin 7. The lower tightening device 9 fixes the position of the lower sliding pitch locating plate 5. The holding clip 10 is connected to the lower sliding pitch locating plate 5 through the pitch locating hinge 11. Locking devices 12 are located at one end of the outer member 1 and at the approximate midpoint of outer member 1.

FIG. 1 shows the measuring device in use with the holding clip 10 connected to the ridge pole 16 and the graduations 13 resting on the wall plate 17.

FIG. 3 shows the relationship of the telescoping inner member 2 to the outer member 1. The locking devices 12 frictionally hold the telescoping inner member 2 in place.

FIG. 4 shows the sliding tracks 18 which hold the upper sliding pitch locating plate 4 and the lower sliding pitch locating plate 5 in place.

FIG. 5 shows the rafter width clip 14 attached to the inner member 2 in position over wall plate 17. The rafter width clip 14 contains notches 15 to help position and balance the measuring device.

FIG. 6 shows the channel depth x along with the notches 15 contained in the rafter width clip 14.

FIG. 7 shows the rafter 21 with the seat cut 20 resting on the wall plate 17.

FIG. 8 shows the design for hip and valley rafters. The upper pitch locating plate 4' and the lower pitch locating plate 5' are cut at a 45 degree angle. The holding clip 10' fits over the hip rafter and is attached to the lower pitch locating plate 5' by the pitch locating hinge 11'.

In operation the inner member 2 is contained within the outer member 1. The locking devices 12 are loosened and the inner member 2 is free to telescope out of the outer member 1. The upper tightening device 8 and the lower tightening device 9 are loosened so that the upper sliding pitch locating plate 4 and the lower sliding pitch locating plate 5 are free to move forward. The holding clip 10 is set over the ridge pole 16 as shown in FIG. 1. The upper operating pin 6 and the lower operating pin 7 are moved so that the holding clip 10 fits flush against the side of the ridge pole 16. The upper sliding pitch locating plate 4 fits flush against the holding clip 10. Note in FIG. 1 that the holding clip 10 does not fit flush on top of the ridge pole 16. This is to compensate for the depth of the seat cut 20. The upper tightening device 8 and the lower tightening device 9 are set to hold both upper sliding pitch locating plate 4 and lower sliding pitch locating plate 5 firmly in place. The inner member 2 is set on the wall plate 17 with the graduations 13 or the end of the inner member 2 in contact with the outer edge of the wall plate 17. Locking devices 12 are then tightened to hold the inner member 2 in place as shown in FIG. 3.

The tool is then simply transferred to the material used as a rafter. The rafter 21 is cut at the angle formed by the outer edges of the upper sliding pitch locating plate 4 and the lower sliding pitch locating plate 5 where the rafter joins the ridge pole 16. See FIG. 1. This angle is always exactly the same as what is commonly called the pitch of a roof. The seat cut 20 (FIG. 7) is the portion cut in the rafter 21 so that it fits flush on the wall plate 17. The angle of the seat cut 20 is exactly the same as the pitch. Referring to FIG. 7, in order for the rafter 21 to fit flush on the wall plate 17 a 90° angle is required to complete the seat cut 20. A bevel square commonly used in the industry is set at the angle of the pitch, then placed in the appropriate position on the rafter 21 for the seat cut 20. The bevel square insures the 90° angle occurs on the seat cut 20. No reference need be made to any conversion tables. The length of the rafter is simply the total measurement of measuring tool. Any overhang for the roof is simply added to the measurement.

Referring now to FIG. 8, hip and valley rafters require the edge of the upper pitch locating plate 4' and the lower pitch locating plate 5' to be set at a 45 degree angle because the valley rafters join the hip rafters at a 45° angle. These plates are simply inserted into the track 18 shown in FIG. 4 after screwably removing the upper and lower operating pins 6 and 7; then the upper pitch locating plate 4 and lower pitch locating plate 5 slide out of the outer member 1. The holding clip 10' then fits flush against the hip rafters so that the pitch cut and 45 degree angle cut are apparent.

Referring now to FIG. 2 the overall length of the rafter measured can be decreased by loosing clasp 19 of the outer member 1. The inner member 2 is removed from the outer member 1. Outer member 1 is then folded back upon itself around hinge 3. The inner member 2 is then inserted into outer member 1 at its midpoint. This allows a short rafter to be measured.

In the preferred embodiment, the width of the inner member 2 is $3\frac{1}{2}''$. This corresponds to the present dimensions of a 2×4 commonly used in construction. The upper sliding pitch locating plate 4 is 8" long and $2\frac{3}{4}''$ wide. The lower sliding pitch locating plate 5 is 2" long and $2\frac{3}{4}''$ wide. The overall length of outer member 1 is 11 feet and the overall length of inner member 2 is 10 feet. When the outer member 1 is folded as described above it is approximately $5\frac{1}{2}$ feet long.

In some cases, the rafters used will not be 2×4's. For this reason the preferred embodiment contains a rafter width clip 14 made of transparent material, e.g. a clear plastic. This is frictionally held to the inner member 2. Notches 15, or the base of the rafter width clip 14, are provided for the positioning of the rafter width clip 14 on the outer edge of the wall plate 17. See FIG. 5. The clear plastic can be etched with perpendicular lines from the notches 15. This allows the graduations 13 to be read through the clear plastic. Alternatively, the clear plastic rafter width clip 14 could contain additional graduations etched on itself. The measurement x shown in FIG. 6 would vary depending upon the dimensions of the rafters being used. For example, in a 2×6, the dimension x would be 2". In a 2×8, the dimension x would be 4".

Accordingly, it will be apparent to those skilled in the art that various modifications may be made to the preferred embodiment described above without departing from the spirit and scope of the following claims.

I claim:

1. A device for measuring lengths and conforming angles comprising:
    a. An outer member with, at one end, tracks on the inside of the outer member within which slide an upper pitch locating plate and a lower pitch locating plate with a hingeably connected holding clip;
    b. An inner member slideably moveable within the other end of said outer member;
    c. Two locking devices located at the midpoint of the outer member and two locking devices located at the other end of said outer member; and
    d. An upper operating pin and an upper tightening device for positioning said upper pitch locating plate wherein said upper operating pin is screwably attached to said upper pitch locating plate and a lower operating pin and lower tightening device for positioning said lower pitch locating plate wherein said lower operating pin is screwably attached to said lower pitch locating plate.

2. The device of claim 1 wherein the outer edge of said upper pitch locating plate and the outer edge of said lower pitch locating plate is set at a 45° angle.

3. The measuring device of claim 1 wherein said inner member is $3\frac{1}{2}$ inches wide.

4. The device of claim 1 further comprising a rafter width clip with x dimension frictionally attachable to said inner member.

5. The device of claim 4 wherein said rafter width clip is tranparent and contains one or more notches on the base of said rafter width clip.

* * * * *